(12) United States Patent
Campbell et al.

(10) Patent No.: US 10,447,850 B2
(45) Date of Patent: *Oct. 15, 2019

(54) FACILITATING ARRANGEMENT IN A COMMUNICATION SYSTEM

(71) Applicant: TRUPHONE LIMITED, London OT (GB)

(72) Inventors: Alistair James Campbell, Kent (GB); James Tagg, Edenbridge (GB); Kevin Dixon, Oxfordshire (GB); Mal Minhas, Berkshire (GB); Tuomas Syrjanen, Helsinki (FI); Sampsa Vehkamaki, Helsinki (FI); Timo Koola, Helsinki (FI); Lauri Tielinen, Masala (FI); Pasi Valminen, Espoo (FI)

(73) Assignee: Truphone Limited (GB)

( * ) Notice: Subject to any disclaimer, the term of this patent is extended or adjusted under 35 U.S.C. 154(b) by 341 days.

This patent is subject to a terminal disclaimer.

(21) Appl. No.: 14/884,727

(22) Filed: Oct. 15, 2015

(65) Prior Publication Data

US 2016/0044168 A1 Feb. 11, 2016

Related U.S. Application Data

(63) Continuation of application No. 12/523,608, filed as application No. PCT/GB2008/000171 on Jan. 18, 2008, now Pat. No. 9,191,504.

(30) Foreign Application Priority Data

Jan. 18, 2007 (FI) ..................................... 20070044

(51) Int. Cl.
*H04M 3/42* (2006.01)
*H04W 8/18* (2009.01)
(Continued)

(52) U.S. Cl.
CPC .... *H04M 3/42374* (2013.01); *H04L 65/1069* (2013.01); *H04L 67/24* (2013.01);
(Continued)

(58) Field of Classification Search
None
See application file for complete search history.

(56) References Cited

U.S. PATENT DOCUMENTS

| 8,144,853 B1 * | 3/2012 | Aboujaoude | H04M 3/42374 370/352 |
| 9,191,504 B2 * | 11/2015 | Campbell | H04M 3/42093 |

(Continued)

OTHER PUBLICATIONS

Foreign Priority Specification Document, Application PCT/GB2008/000171 (Jan. 18, 2008).*

*Primary Examiner* — Xavier Szewai Wong

(57) ABSTRACT

A method for determining the availability of at least one target user for a specific type of communication is described. The method comprises: retrieving contact information of at least one target user from a memory of a requesting user terminal; sending a request for communication status information of the at least one target user to a status network element, the status network element being arranged to provide the communication status information regarding the availability of the target user for the specific type of communication, wherein the request comprises at least a portion of the contact information of the at least one target user and identifies the specific type of communication; receiving, as a response to the request, a response message from the status network element, wherein the response message comprises the communication status information of the at least one target user; and modifying at least a portion of stored contact information when the received status information indicates that the target user is available for communication via the specific communication type, such that the modified contact (Continued)

information indicates on the requesting user terminal the current availability of the at least one user for communication via the specific communication type.

27 Claims, 7 Drawing Sheets

(51) Int. Cl.
  *H04L 29/06* (2006.01)
  *H04L 29/08* (2006.01)
  *H04L 12/58* (2006.01)
(52) U.S. Cl.
  CPC ....... *H04M 3/42093* (2013.01); *H04W 8/183* (2013.01); *H04L 51/04* (2013.01); *H04M 3/42365* (2013.01)

(56) References Cited

U.S. PATENT DOCUMENTS

| | | | |
|---|---|---|---|
| 2005/0138108 A1* | 6/2005 | Galvin, Jr. | H04L 67/24 709/201 |
| 2005/0210104 A1* | 9/2005 | Torvinen | G06Q 10/10 709/205 |
| 2007/0016640 A1* | 1/2007 | Auvray | H04L 51/04 709/205 |
| 2008/0177872 A1* | 7/2008 | Vengroff | H04L 67/02 709/223 |
| 2010/0162171 A1* | 6/2010 | Felt | H04M 1/27455 715/835 |
| 2011/0116619 A1* | 5/2011 | Bjorkner | H04M 7/0057 379/315 |
| 2016/0014059 A1* | 1/2016 | Rathod | H04L 12/1818 715/752 |

* cited by examiner

162 → SUBSCRIBE sip:+35850123456@example.com SIP/2.0                    140
164 → Via: SIP/2.0/UDP TermA.example.com
166 → From: sip:+35850223344@example.com
       To: sip:+35850123456@example.com
168 → Call-ID: 9987@TermA.example.com
170 → CSeq: 9887 SUBSCRIBE
172 → Contact: sip:+3585022334 4@TermA.example.com
174 → Event: presence
176 → Accept: application/pidf+xml
       Content-Length: 0                              Figure 6

154
162 → NOTIFY sip: +35850223344@TermA.example.com SIP/2.0
164 → Via: SIP/2.0/UDP statserv.example.com
166 → From: sip:+35 85012 34 5 6@example.com
       To: sip:+35850223344@example.com
168 → Call-ID: 9987@TermA.example.com
170 → CSeq: 1289 NOTIFY
172 → Contact: sip:statserv.example.com
174 → Event: presence
176 → Content-Type: application/pidf+xml
       Content-Length: ...
                                                 180
       <?xml version="1.0"?>
       ...
182 → Registration aor="sip:+35850123456@example.com"
184 → status="available">
                                          188
       ⎧ <contact>
186 → ⎨ <uri>sip:+358800333444555@TermB.example.com</uri>
       ⎩ </contact>
                                                 Figure 7
       </registration>

FACILITATING ARRANGEMENT IN A COMMUNICATION SYSTEM

CROSS REFERENCES TO RELATED APPLICATIONS

This application claims priority to U.S. application Ser. No. 12/523,608 filed on Mar. 30, 2010. That application was a national stage application of international application number PCT/GB2008/000171 filed on Jan. 18, 2008 which claims priority to Finnish patent application number 20070044 filed on Jan. 18, 2007, the entire disclosures of which are hereby incorporated by reference.

TECHNICAL FIELD OF THE INVENTION

The present invention relates in general to communication between user terminals and, in particular, to facilitating communication according to a specific communication type between the user terminals. More specifically, the present invention relates to a method for and terminal for determining the availability of at least one target user for a specific type of network communication in an efficient manner.

BACKGROUND OF THE INVENTION

In the past, there was a clear distinction between telecommunication and data communication networks. Telecommunication networks, such as Public Switched Telephone Networks (PSTN) and Public Land Mobile Networks (PLMN) carry voice and data over circuit-switched connections, where the 'circuit', e.g. a time slot in a wireless connection or a digital transmission line, is reserved for the voice or data call for the whole duration of the call, even during idle periods, i.e. when there is no voice or data to transmit.

Data communication networks, on the other hand, typically carry data over packet-switched connections, where network resources are reserved for a particular session only when there is data to be transmitted. When the session is idle, network resources are allocated to carrying data for other, active sessions. A vast majority of today's data communication networks are based on protocols that utilize the TCP/IP protocol stack. An example of such network is the Internet, which in today's language may refer to any one of a number of different networks implemented with different protocols, such as the World Wide Web (HTTP) or Usenet (NNTP). Recently, technical development has been leading towards convergence of telecommunication and data communication networks, which means in general that both telecommunication and data communication applications use the same physical and/or logical network for carrying voice and data. This trend has many advantages both from a network operator's and a consumer's point of view. For example, a network operator needs to invest in and maintain only one physical network instead of two parallel networks for telecommunication and data communication traffic, respectively. This reduces capital, operating, and maintenance expenses that the operators incur, which in turn should bring about lower call and data transfer rates for subscribers. In some countries this convergence of tele-communication and data communication may be slowed down by pricing policies of the network operators, which they may use to safeguard return on their past investments in telecommunication infrastructure.

In a network that is built to carry both telecommunication and data communication traffic, arranging the communication according to a packet-switched scheme is an advantageous design choice, as at least in theory serving the same amount of subscribers requires less capacity in a packet-switched network than in a circuit-switched network. This is due to the above mentioned fact that in packet-switched networks, a session consumes network resources only when there are data packets to be transmitted, and during idle periods the network resources are available for other sessions.

As already mentioned, TCP/IP-based networks are nowadays the prevailing type of packet-switched networks. Methods and protocols have been developed for carrying voice over IP networks so that the IP networks are capable of providing voice communication services. Schemes for carrying voice over IP networks are commonly referred to as Voice over IP or VoIP. With the advent of VoIP services and applications, consumers have been able to use their home computers as voice communication devices and make phone calls over their Internet connections at relatively low flat rates.

VoIP calls are also available over Wireless Local Area Network (WLAN) connections, and along with introduction of dual-mode or multi-mode mobile phones, which are equipped with hardware and software for connecting the phone to a WLAN network, the option for making a VoIP call perhaps at a lower rate as compared to that of e.g. a GSM call rate has become available also for mobile phone users.

Making a VoIP/Internet call from a mobile phone at a flat rate may require that the call is a VoIP call end-to-end, i.e. both parties of the call are available for a VoIP call. For example, if a calling party is available for a VoIP service, but the called party is not within a VoIP service area, the call may e.g. be transmitted through a VoIP gateway to and terminate in a GSM network, and the GSM leg of the call may be charged at a rate set by the GSM operator, which may negate the benefit of the flat rate of the VoIP leg of the call.

It would therefore be useful if the calling party knew before making a VoIP call or initiating another type of connection, whether the called party were available for the VoIP call or the other type of communication. Obviously, the calling party could contact the called party by other means, e.g. by making a telephone call through GSM or fixed line service, before trying to make a VoIP call to check that the called party is actually within a VoIP service area, but it is inconvenient to first make e.g. a GSM call and then the VoIP call, possibly dialing both telephone numbers by means of the mobile phone keypad, and at least one party of the call incurs the cost of the GSM call.

It is an object of the present invention to eliminate or at least alleviate the above described inconveniences.

SUMMARY OF THE INVENTION

According to a first aspect of the invention there is provided a method for determining the availability of at least one target user for a specific type of communication, the method comprising: retrieving contact information of at least one target user from a memory of a requesting user terminal; sending a request for communication status information of the at least one target user to a status network element, the status network element being arranged to provide the communication status information regarding the availability of the target user for the specific type of communication, wherein the request comprises at least a portion of the contact information of the at least one target user and identifies the specific type of communication; receiving, as a response to the request, a response message from the status network element, wherein the response message comprises the communication status information of the at least one target user; and modifying at least a portion of stored contact information when the received status information indicates that the target user is available for communication via the specific communication type, such that the modified contact information indicates on the requesting user terminal the current availability of the at least one user for communication via the specific communication type.

The present invention has several advantages. For example, the invention eliminates the need for checking by other means the availability of a called party for a VoIP call, thereby eliminating the inconvenience and cost associated with the use of the other means. Furthermore, the invention provides efficient management of VoIP contacts in a user terminal contact list by enabling automatic creation of and inclusion of VoIP contacts into one or more VoIP contact groups.

Preferably, the method further comprises sensing the occurrence of a predetermined trigger event in the operation of the user terminal, and sending the request for status information automatically as a response to the sensed trigger event. This is a highly advantageous aspect of the present invention in that it enables the updating of the stored contact information becomes an event which does not have to be specifically actioned by the requesting user. Also the update can be tailored to be driven by specific events which may necessitate knowledge of the current availability of a target user, for example opening a contacts list option for example. In this case a request could be generated and sent at an early stage of looking at contact information which would mean the availability status information would be updated quicker than the conventional manner of getting to a specific contacts profile and then requesting the status information.

The sensing step can be sensing storing of new contact information into the memory of the user terminal as the trigger event Alternatively the sensing step can comprise sensing the commencing of a communication application for a specific communication type on the user terminal, as the trigger event Both of these trigger events provide benefits outlined above.

Advantageously, the method may further comprise creating a new contact group of users at the requesting user terminal and the adding step comprises adding the at least one target user to the new contact group of target users. Preferably, the creating step and adding steps are implemented on a dynamic group, where membership of the group is based upon the current communication availability status of each user. Dynamic groups are advantageous in that they provide the user with a selection of target users with whom communications can be achieved via a certain type of communications.

Advantageously, the receiving step comprises receiving in the response message the at least one target user's current contact information for the specific communication type, the current contact information being provided by the status network element. In this way, new contact details are also provided which may not have been previously available to the requesting user terminal or which may have been outdated. In an embodiment of the invention the specific communication type comprises Voice over IP (VoIP). In another embodiment of the invention the specific communication type comprises instant messaging or multimedia messaging. In a yet another embodiment the specific communication type comprises a GSM call.

A further problem with determining the availability status of a remote target user for a communication is that this can result in a considerable amount of additional data communications with the status network node being required. This is disadvantageous because of the increased data traffic generated and also the resultant drain on battery life of a wireless user terminal.

The present invention mitigates this problem by grouping together the status requests and sending them at scheduled intervals to the status server. This has the significant benefit of reducing the number of status determining communications required and thereby conserving precious battery life on the wireless user terminal.

More specifically, the present invention preferably further comprises sending a request for status information for a group of target users to the status network node to determine the communication availability status of each member of the group for the specific type of communication. Furthermore, when the present invention is being implemented on a mobile device capable of GSM communications, the sending step may advantageously comprise sending a batch of requests for the group of target users in time slots of a GSM air interface which are reasonably close together. Thus, rather than having the GSM system report each status change, it reports status changes in batches where those batched status changes are further apart in time. This allows the mobile device to drop to a lower power saving mode in between.

Further, the status of each target user can advantageously be used to establish a dynamic on-line group of target contacts with whom the user can communicate. This can be automatically updated such that the user is always aware of the types of possible communications available for a given target user.

In response to the request, the receiving step may comprise receiving a response message, wherein the response message comprises a collection of communication availability status responses for the group of target users. This advantageously minimises the number of messages which the requesting user terminal has to process and ensures that the contact information can advantageously be updated at approximately one moment in time, thus avoiding the problem of differential updating of the store of status information, which may lead to discrepancies in communications.

The present invention may comprise a method in which the response message comprises communications status information for a plurality of types of communication possible with the at least one target user. Thus the response can updated multiple types of communications and enable the user with a single response to select which one of the possible types of communications to use.

Furthermore, the plurality of types of communication possible with the at least one target user in combination may define an available multiple-type communications path to the target user.

Another problem with arises when using a conventional mobile telecommunications device for carrying out the above described communication status determination prior to the communication, relates to the way in which the current status is presented to the requesting user on their mobile telecommunications device. It is often not easy for the user to determine the status because of the limited screen size or multiple pages are provided for the contacts status to be ascertained. Providing status information can take up parts of the user interface which could be otherwise used for important information.

The present invention addresses this problem by the method preferably further comprising modifying an image forming part of the target user's contact information such that the modified image includes an overlaid visual indication of the target user's availability for the specific type of communication. This maximises the entropy of the image and does not use up any further space in the user interface.

More preferably, in the method of the present invention, the modifying step preferably comprises modifying the image with a plurality of overlaid images to indicate that a plurality of different types of communication are available for the target user. This further enhances to use of the available screen size to maximises information without needing to move to a new screen.

Preferably the method further comprises constructing and sending an update message to a status network element, the update message indication a change in availability status of the requesting user terminal.

Preferably the constructing and sending steps are carried out as a result of a trigger event. The trigger event is preferably caused by a predetermined action by the requesting user which changes a mode of operation of the requesting user terminal. In this way the status of the requesting user terminal can be updated by a change in its operating conditions automatically without the requesting user's specific action. For example changing the profile of a mobile telecommunications device to silent can result in a 'do not disturb' status being generated and sent regarding that device.

According to another aspect of the present invention there is provided a requesting communication user terminal for determining the availability of at least one remote target user for a specific type of communication, the terminal comprising: a memory for storing contact information of a-plurality of target users; retrieving means for retrieving contact information of at least one target user from the memory; transmitting means for transmitting a request for communication status information of the at least one target user to a status network element, the status network element being arranged to provide the communication status information regarding the availability of the target user for the specific type of communication, wherein the request comprises at least a portion of the contact information of the at least one target user and identifies the specific type of communication; receiving means for receiving, as a response to the request, a response message from the status network element, wherein the response message comprises the communication status information of the at least one target user; and modifying means for modifying at least a portion of stored contact information when the received status information indicates that the target user is available for communication via the specific communication type, such that the modified contact information indicates on the requesting user terminal the current availability of the at least one user for communication via the specific communication type.

Preferably the terminal further comprises a set of predetermined trigger events stored in the terminal, and sensing means for sensing the occurrence of one of the predetermined trigger events in the operation of the user terminal, and in response thereto automatically activating the transmitting means to send the request for status information. The advantages of this have been stated previously.

Advantageously the terminal further comprises adding means for adding the at least one user to a stored contact group of users.

Preferably the terminal further comprises creating means for creating a new contact group of users at the requesting user terminal and wherein the adding means is arranged to add the at least one target user to the new contact group of users. The creating means and the adding means may be arranged to operate on a dynamic group, where membership of the group is based upon the current communication availability status of each user. The advantages of this feature have been described above.

According to a further aspect of the present invention, there is provided a status network element for providing a communications availability status of a target networked user terminal for a specific type of communication channel, the status network element comprising: a database of registered user entries, each registered user entry including status information about a particular type of communications channel, the status information comprising: the address of a registered user terminal within that channel and the status of the connection availability to the user terminal within the channel; compiling means arranged to retrieve status information regarding a registered user from at least one networked communication element with which the target user terminal is registered for a particular type of communications and to store the same in the database; receiving means arranged to receive a communications status request for a target user terminal and to retrieve the relevant registered user entry from the database; and communications means for transmitting the retrieved communication status and network address of the target user terminal to a requesting user terminal for updating an communications availability status of the target user within a stored list of users.

The status network element aggregates the relevant information from many network elements to compile a single resource of the communication status of a plurality of target users. This advantageously enables requesting user terminals to determine relatively quickly the correct availability status of the target users.

Preferably, the compiling means is arranged to generate a request message for retrieving the required status information, the request message being in a format supported by the networked communications element.

The present invention also extends to a system for determining availability of at least one target user for a specific communication type, wherein the system comprises: a requesting communication user terminal user terminal as described above and a status network element as described above.

According to another aspect of the present invention there is provided an application comprising program code means arranged to carry out the steps of the method defined above, when the program code means are loaded into the memory of and executed by a device capable of executing the application. Further, the present invention may extend to a device for communication comprising an application as described above.

The present invention also extends to cover one or more of the following embodiments:

1. A method for determining the availability of at least one target user for a specific type of communication, the method comprising: retrieving contact information of at least one target user from a memory of a requesting user terminal; sending a request for communication status information of the at least one target user to a status network element, the status network element being arranged to provide the communication status information regarding the availability of the target user for the specific type of communication, wherein the request comprises at least a portion of the contact information of the at least one target user and identifies the specific type of communication; receiving, as a response to the request, a response message from the status network element, wherein the response message comprises the communication status information of the at least one target user; and modifying at least a portion of stored contact information when the received status information indicates that the target user is available for communication via the specific communication type, such that the modified contact information indicates on the requesting user terminal the current availability of the at least one user for communication via the specific communication type.

2 A method according to embodiment 1, further comprising sensing the occurrence of a predetermined trigger event in the operation of the user terminal, and sending the request for status information automatically as a response to the sensed trigger event.

3. A method according to embodiment 2, wherein sensing step comprises sensing storing of new contact information into the memory of the user terminal as the trigger event.

4. A method according to embodiment 2, wherein sensing step comprises sensing the commencing of a communication application for a specific communication type on the user terminal, as the trigger event.

5. A method according to any preceding embodiments, wherein the sending step comprises sending a request for status information for a group of target users to the status network node to determine the communication availability status of each member of the group for the specific type of communication.

6. A method according to embodiment 5, wherein the sending step comprises sending a batch of requests for the group of target users by delaying a report of a presence status change for selected target users until a scheduled update interval.

7. A method according to embodiment 5 or 6, wherein the receiving step comprises receiving a plurality of response messages, one for each member of the group.

8. A method according to embodiment 7, wherein the receiving step comprises receiving a response message, wherein the response message comprises a collection of communication availability status responses for the group of target users.

9. A method according to any preceding embodiment, wherein the response message comprises communications status information for a plurality of types of communication possible with the at least one target user.

10. A method according to embodiment 8, wherein the plurality of types of communication possible with the at least one target user in combination define an available multiple-type communications path to the target user.

11. A method according to any preceding embodiment, further comprising adding a visual indication of the at least one user's availability for the specific type of communication to the user's contact information.

12. A method according to any preceding embodiment, further comprising adding the at least one user to a contact group of users.

13. A method according to embodiment 12, further comprising creating a new contact group of users at the requesting user terminal and the adding step comprises adding the at least one user to the new contact group of users.

14. A method according to embodiment 13, wherein the creating step and adding steps are implemented on a dynamic group, where membership of the group is based upon the current communication availability status of each user.

15. A method according to any preceding embodiment, wherein the receiving step comprises receiving in the response message the at least one user's current contact information for the specific communication type, the current contact information being provided by the status network element.

16. A method according to any preceding embodiment, further comprising modifying an image forming part of the target user's contact information such that the modified image includes an overlaid visual indication of the target user's availability for the specific type of communication.

17. A method according to embodiment 16, wherein the modifying step comprises modifying the image to indicate that a plurality of different types of communication are available for the target user.

18. A method according to any preceding embodiment, wherein the specific communication type comprises Voice over IP (VoIP).

19. A method according to any of embodiments 1 to 17, wherein the specific communication type comprises instant messaging or multimedia messaging.

20. A method according to any of embodiments 1 to 17, wherein the specific communication type comprises a GSM call.

21. A requesting communication user terminal for determining the availability of at least one remote target user for a specific type of communication, the terminal comprising:
A memory for storing contact information of a plurality of target users;
Retrieving means for retrieving contact information of at least one target user from the memory;
Transmitting means for transmitting a request for communication status information of the at least one target user to a status network element, the status network element being arranged to provide the communication status information regarding the availability of the target user for the specific type of communication, wherein the request comprises at least a portion of the contact information of the at least one target user and identifies the specific type of communication;
Receiving means for receiving, as a response to the request, a response message from the status network element, wherein the response message comprises the communication status information of the at least one target user; and
Modifying means for modifying at least a portion of stored contact information when the received status information indicates that the target user is available for communication via the specific communication type, such that the modified contact information indicates on the requesting user terminal the current availability of the at least one target user for communication via the specific communication type.

22. A terminal according to embodiment 21, further comprising a set of predetermined trigger events stored in the terminal, and sensing means for sensing the occurrence of one of the predetermined trigger events in the operation of the user terminal, and in response thereto automatically activating the transmitting means to send the request for status information.

23. A terminal according to embodiment 21 or 22, further comprising adding means for adding the at least one user to a stored contact group of users.

24. A terminal according to embodiment 23, further comprising creating means for creating a new contact group of users at the requesting user terminal and wherein the adding means is arranged to add the at least one target user to the new contact group of users.

25. A terminal according to embodiment 24, wherein the creating means and the adding means arranged to operate on a dynamic group, where membership of the group is based upon the current communication availability status of each target user.

26. A status network element for providing a communications availability status of a target networked user terminal for a specific type of communication channel, the status network element comprising: a database of registered user entries, each registered user entry including status information about a particular type of communications channel, the status information comprising: the address of a registered user terminal within that channel and the status of the connection availability to the user terminal within the channel; compiling means arranged to retrieve status information regarding a registered user from at least one networked communication element with which the target user terminal is registered for a particular type of communications and to store the same in the database; receiving means arranged to receive a communications status request for a target user terminal and to retrieve the relevant registered user entry from the database; and communications means for transmitting the retrieved communication status and network address of the target user terminal to a requesting user terminal for updating an communications availability status of the target user within a stored list of target users.

27. A status network element according to embodiment 26, wherein the compiling means is arranged to generate a request message for retrieving the required status information, the request message being in a format supported by the networked communications element.

28. A system for determining availability of at least one target user for a specific communication type, wherein the system comprises: a requesting communication user terminal according to embodiment 21; and a status network element according to embodiment 26.

29. An application comprising program code means arranged to carry out the steps of the method defined in any one of claims 1 to 20, when the program code means are loaded into the memory of and executed by a device capable of executing the application.

30. A device for communication comprising an application according to embodiment 29.

In the following advantageous embodiments of the present invention are explained in detail with reference to the appended drawings. A person skilled in the art appreciates that the embodiments are described for illustrative purposes only and are not intended to limit the spirit and scope of the claims to the described embodiments. A skilled person also appreciates that an aspect of the invention may be used in combination of one or more of the disclosed embodiments.

BRIEF DESCRIPTION OF THE DRAWINGS

FIG. 6 is a diagram showing a code fragment which comprises a SIP SUBSCRIBE message used by the user terminal to request the status of a target user terminal from the status server in the message flow of FIG. 5;

FIG. 7 is a diagram showing a code fragment which comprises a SIP NOTIFY message used by the status server to respond to a user enquiry in the message flow of FIG. 5.

DETAILED DESCRIPTION OF PREFERRED EMBODIMENTS OF THE PRESENT INVENTION

Figure 1:
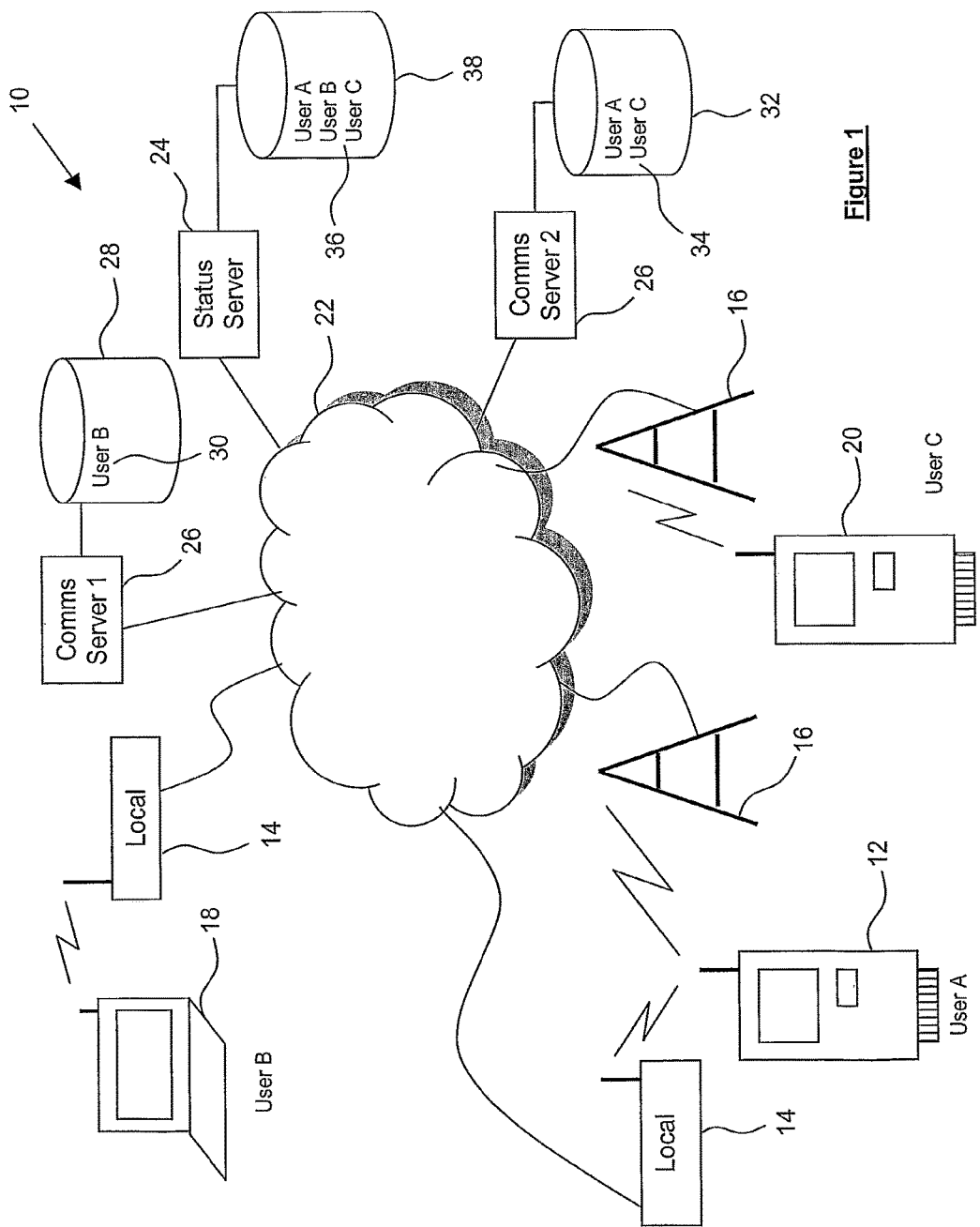
FIG. 1 is a schematic diagram illustrating a simplified example of a communications network where an embodiment of the present invention can be utilized.

FIG. 1 is a simplified illustration of a network architecture 10, where the present invention can be used. A dual-mode wireless user terminal 12 for a user A communicates with a local station 14 in a first communication mode and with base station 16 in a second communication mode. The first communication mode may use, for example, short-range radio technology, such as Wireless Local Area Network (WLAN) or Bluetooth, and the second communication mode may use a longer range radio technology, such as Global System for Mobile communications (GSM), General Packet Radio Service (GPRS), Universal Mobile Telecommunications System (UMTS), or other public land mobile network (PLMN) technology.

A second wireless user terminal 18 for User B is also shown, which only has the ability to communicate via a local station 14. An example of this may be a laptop computer for example.

A third wireless user terminal 20 for User C is shown, which only has the ability to communicate via a base station 16. An example of this may be a mobile telecommunications device.

Local stations 14 and base stations 16 are connected by means of the network infrastructure of each network (not shown) to a core network 22, which is preferably a packet-switched network, such as an IP network. PLMN network infrastructure that is used to connect the local station 14 and other local stations 14 to the core network 22 may comprise network elements such as base station controllers (BSC), radio network controllers (RNC), mobile switching centres (MSC), media gateways and their controllers, and support nodes (SGSN and GGSN). WLAN infrastructure may comprise routing and switching elements as well as authentication centres and mobility management servers.

FIG. 1 also shows a status server 24 and two communication servers 26. Status server 24 and communication servers 26 are depicted as separate physical devices, but as far as the present invention is concerned these servers 24, 26 are to be understood as entities providing status and communication services. These status and communication service providing entities may comprise hardware and software components, and can reside in one physical device, or the service functionality of the entities can be distributed to a number of physical devices.

For the purposes of understanding the present embodiment, a communication server 26 (Communication Server 1) is shown having a local database 28. User B has its communication details 30 registered in this local database 28. Similarly, a further communication server 26 (Communication Server 2) is provided which has a local registration database 32 storing the details 34 of its registered users, in this example, Users A and C. However, it is to be appreciated that the number and combination of user terminals 12,18, 20 and communication servers 26 is limitless. Further, a given user can be registered on different communication servers 26 for different types of communication service, for example if communication server 1 was a VoIP communication server and communication server 2 was a instant messaging server, User B could be registered to both servers 26, each registration representing a different communication channel for the User B terminal 18.

The status server 24 may be any server that is arranged to provide, on request, status information (communications connectivity status) on individual users or groups of users. The status server 24 stores aggregated information 36 about the connectivity status of all users (Users A, B and C) for each of their possible communications channels in a local status database 38. This database 38 can be accessed to determine the current availability status of any user registered with the status server 24 for any given communication channel, such as VoIP.

Figure 2:
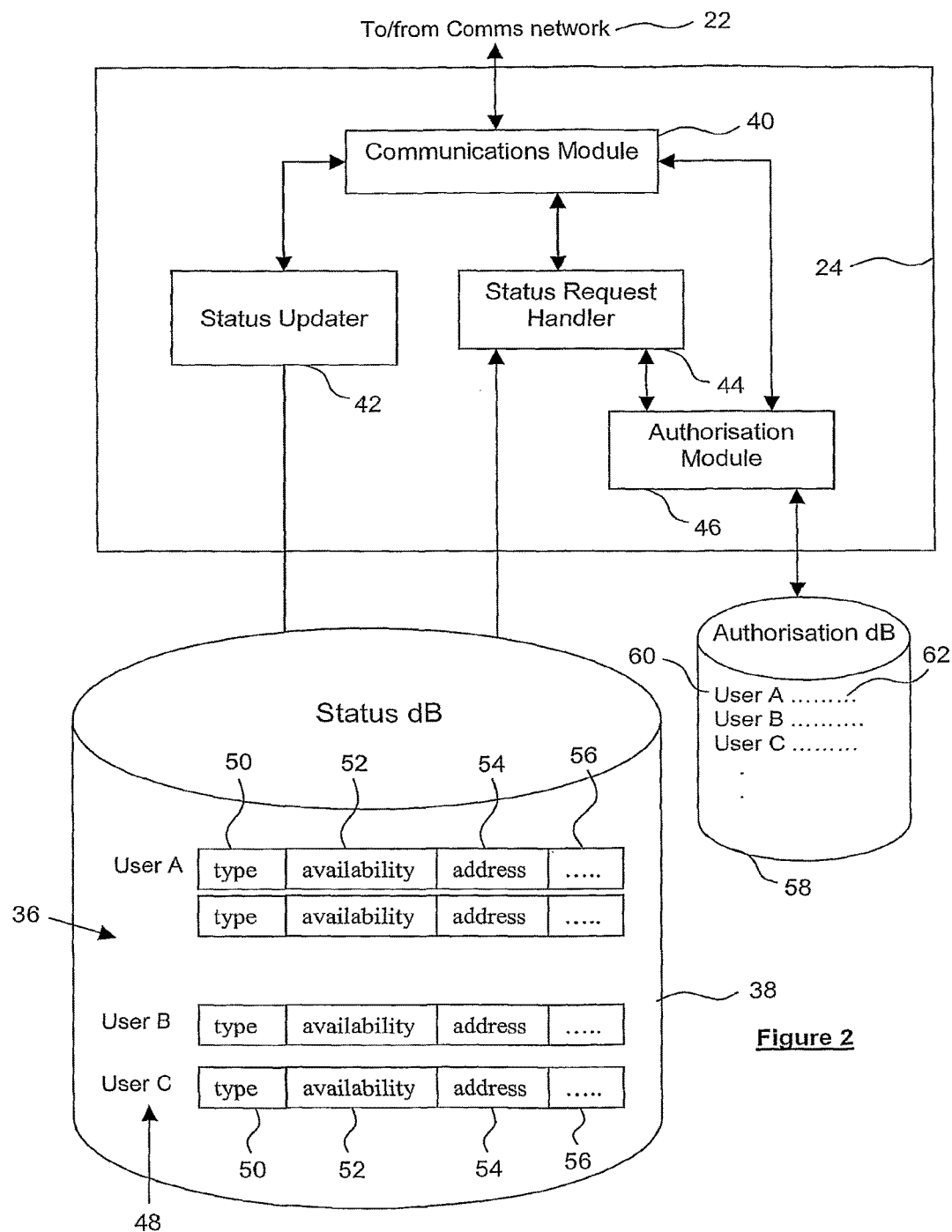
FIG. 2 is a schematic block diagram showing the functional components of the status server of an embodiment of the present invention together with the associated status and authorisation databases.

FIG. 2 shows the components of the status server 24 in greater detail. The status server 24 comprises a communications module 40, which provides basic server functionality by enabling data communications to other parties via the core communications network 22. The communications module 40 is operatively connected to each of the other components of the status server 24, namely a status updater 42, a status request handler 44 and an authorisation module 46.

The status updater 42 functions to update the status of each registered user in several different ways (described below). It is directly coupled to the status database 38 and writes status information directly thereto. The status information 36 is stored in a list of users 48 where the stored information for each user includes the type of communication channel 50, the availability 52 of that communications channel to the user, the network communications address 54 for that channel, together with other information 56 for example, time since last update of status (see later). The type of communication channel 50 typically not only includes the type of communication being implemented, such as VoIP or instant messaging, but also the specific communications route to be used, for example WLAN, GPRS or 3G.

The status request handler 44 receives status requests from a user terminal (requesting user) via the communications network 22 and the communications module 40. The requests, which identify the requesting user, specify the user whose current communications status is required (target user). The request is first authorised, via the authorisation module 46, which determines whether the requesting user is permitted to obtain the status information for the target user. In order to do this, the authorisation module 46 typically accesses a local authorisation database 58, which retains a list of users 60 and their associated permissions 62 regarding accessibility of other users records, for each communication channel, in the status database 38. Therefore, the authorisation database entry for User B 18 as the target user, can permit communication with User A 12 for a VoIP communication but not permit User A 12 for an instant messaging communication. This is simply achieved by having a separate authorisation field for each type of communications channel. Other methods of authorisation, which are described later, include seeking a specific authorisation from the target user by the authorisation module 46 sending an authorisation request to the target user via the communications module 40 and the communications network 22 and receiving a target user's authorisation response.

If the requesting user has the requisite permissions, the authorisation module 46 notifies the status request handler 44 and access to the status database 38 is permitted for the current request. This permission enables the status request handler 44 to access a record for the target user and retrieve information on the current address 54 of the target user and its availability 52 for a given type of communications channel 50. This retrieved information is send back to the requesting user via the communications module 40 and the communications network 22.

Status information may comprise for example information on a user's current network address 54 and/or availability for communication 52. The status server 24 may receive status information directly from users either by the status updater 42 requesting the status information from the users or by the status updater 42 enabling the users to input (post) the status information to the status server 24. The status server 24 may also gain access to users' status information by the status updater 42 requesting the status information from another network element, such as one of the communication servers 26 where the target user is registered.

Status information can be requested from the status server 24 by any suitable means, for example by sending the status request message to the status server 24 including an indication that status information is requested and an identification of the target user whose status is requested. The indication may be, for example, the presence of a particular field, element, character string or bit sequence in the message itself. The identification may be, for example, a user name or contact information of the target user. The status request message may be in any suitable form, for example in the form of a short message (SMS) or a signalling message of a protocol. The status server 24 is preferably a presence server providing presence service. The general operation of a presence server is outlined below for clarity. However, the detailed operation is known to the skilled addressee and so a detailed description is not required and is not provided herein.

Internet standard RFC 3856 defines presence as ability and willingness of a user to communicate with other users on the network. RFC 2778 defines a model and terminology for describing systems that provide presence information. In such a system, there is a provider of presence service and two types of presence clients, presentities and watchers. A presentity provides presence information that is stored and distributed by the presence service. A watcher receives presence information from the presence service. A watcher can either be a fetcher, that requests a current value of a presentity's presence information from the presence service, or a subscriber, that requests from the presence service a notification of changes in a presentity's presence information. A fetcher that requests presence information on a regular basis from the presence service is called a poller. The user terminals 12, 18, 20 of the present invention may each be a presentity, a fetcher, a subscriber, or a poller or represent any combination thereof.

Presence service related communication between the user terminal 12 and the status server 24 is preferably arranged to use the SIP protocol and its event notification mechanism that are defined in Internet standards RFC 3261 and RFC 3265, respectively. The SIP presence event package is defined in RFC 3856, and utilizes the SUBSCRIBE and NOTIFY methods defined in RFC 3265. The SIP messaging protocol is used in the present non-limiting embodiment for communications between the user terminal and the status server and these SUBSCRIBE AND NOTIFY messages are described in detail later. The communication servers 26 provide the desired communication services. Each communication server 26 is also capable of providing information on registration status 30, 34 of the users of each communications service (communication channel) supported by that server 26. The communication servers 26 may also be arranged to provide the presence service described above. These services include VoIP services, GSM voice services, instant messaging services (IMS), Multimedia messaging Services (MMS) and Short Message Services (SMS) services, for example.

Preferably, both communication servers 26 provide VoIP communication services, though different communication servers 26 can provide different communications services. User terminals for a requesting user and a target user, for example, User A terminal 12 and User B terminal 18, connect to their respective VoIP services over an IP network 22. In the present embodiment, the user terminals 12, 18 preferably use the WLAN network as an IP-based access network to the IP core network 22, but for example a GPRS service could be used as well for carrying the VoIP signalling and voice data packets (which would be the case if User A 12 was seeking to establish a VoIP communication with User C 20 for example).

A user terminal 12 which is configured to operate a VoIP communications channel comprises a speech or speech/audio codec 70 (see FIG. 3), that converts analogue speech signal into digital speech data and digital speech data into analogue speech signal. Basically any codec that is capable of analogue-to-digital conversion can be used, but in a bandwidth-limited system like that of the preferred embodiment of the present invention a codec 70 with compression capabilities, for example a G.729 codec, is preferably used. Digital speech data is arranged into frames, which in turn are inserted into IP packets and carried over the IP network by means of a suitable media protocol, such as Real Time Protocol (RTP), in a manner known to a skilled person. A VoIP service requires further some signalling and call control means like those provided by the H 0.323 signalling protocol or the SIP protocol referred to above. Calls to external systems, such as PSTN or PLMN, require gateways at the border of the two networks and means to control the functions of the gateway. Transcoding between the VoIP and the external network speech coding schemes may be required at the gateway or at another suitable network element. Requirements for implementation of a VoIP service in general are known to a skilled person, and are not explained further herein.

When the user terminal A 12, preferably comprising a VoIP client 72 (see FIG. 3), is switched on and the user terminal A 12 is within the service area of a WLAN base station 14, the VoIP client 72 attempts to register to its communication server 26 (VoIP server). In this case, the user terminal A 12 is configured to set up a WLAN carrier for VoIP traffic. User terminal A 12 may also be configured to set up e.g. a GPRS connection for VoIP traffic as it has both communications channels open to it. If the VoIP client registration is successful at the communication server (VoIP server) 26, the communication server (VoIP server) 26 becomes aware of the user terminal's 12 availability for communication according to a specific communication type (channel), preferably for making and receiving VoIP calls. The communication server (VoIP server) 26 registers the user terminal as available for VoIP calls. In case the registration fails, or the registration is removed (by e.g. switching off the VoIP client 72) or not renewed as required by the VoIP service, the status of the user terminal 12 is changed to or maintained as not available. The VoIP server 26 also stores other information of the users of the service. The stored information may include a user's name, the user's VoIP contact information, such as VoIP number or address, and the user's other contact information, such as the user's mobile phone and/or landline phone number (not shown).

Figure 3:
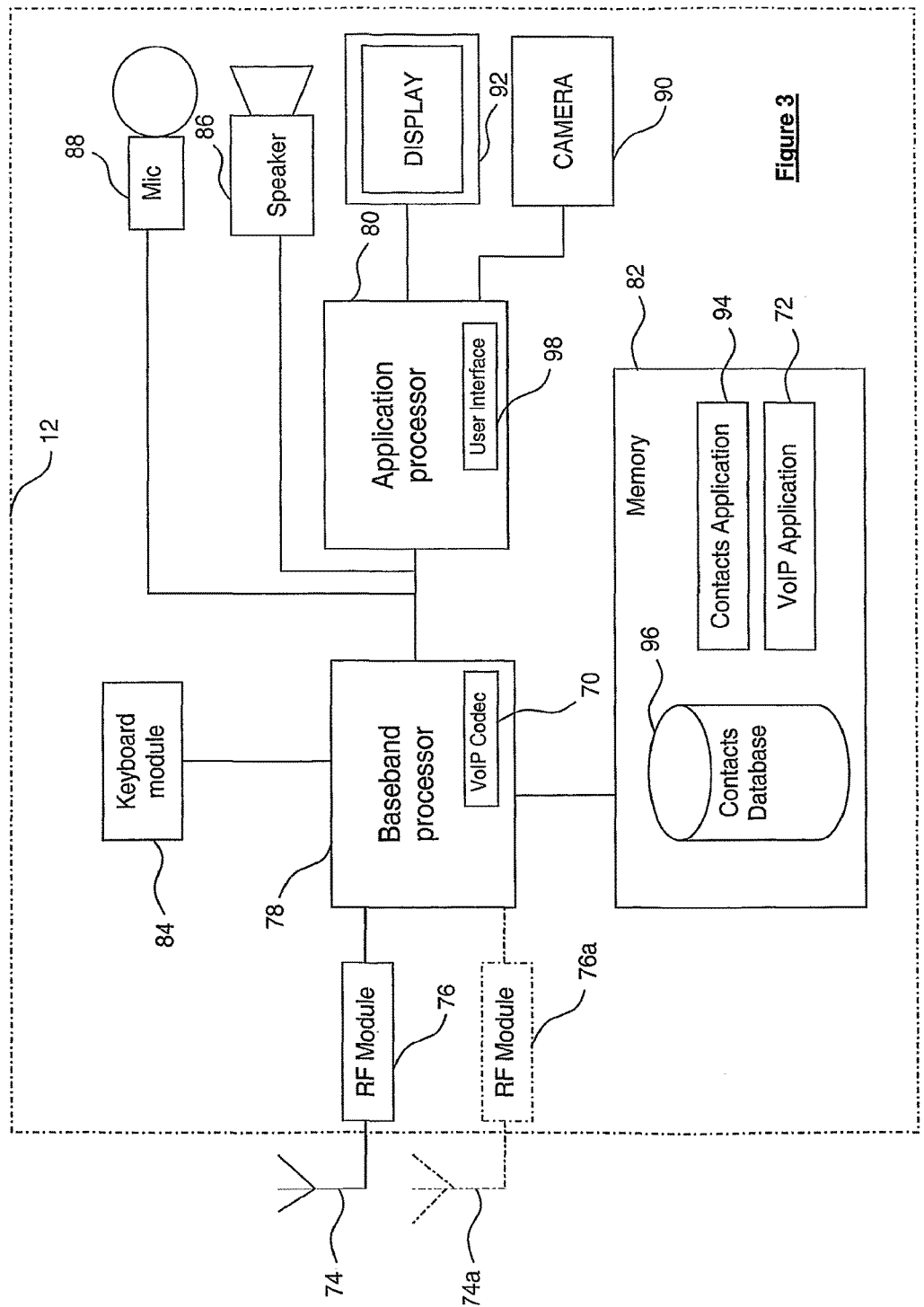
FIG. 3 is a schematic block diagram of a wireless communications terminal of FIG. 1 embodying the present invention showing its structural components.

FIG. 3 shows a basic structure of a wireless user terminal 12. The wireless user terminal 1212 comprises an antenna 74 and an associated RF module 76. A multi-mode user terminal, such as a dual mode WLAN-GSM user terminal for example for User A 12, may comprise an additional antenna 74a, and an associated RF module 76a for each communication mode, i.e. two antennas and two RF modules in case of a dual-mode terminal 12. The RF module 76 may also be software-configurable such that a new communication mode can be entered by loading corresponding software to the RF module 76. The user terminal 12 of FIG. 3 further comprises a baseband processor 78, an application processor 80, a memory 82, a keyboard 84, a speaker 86, a microphone 88, a camera 90 and a display 92.

The baseband processor 78 and application processor 80 comprise system Large Scale Integration chips (LSIs) combined with a Central Processing Unit (CPU), Digital Signal Processor (DSP), and a processor memory (not shown). The baseband processor 78 handles processing of basic telephone functions, and the application processor 80 handles processing of multimedia, such as moving and still images and audio. The memory 82 may comprise e.g. a Flash memory or SRAM as well as SIM card memory.

The user terminal 12 comprises a contacts management application 94 according to an embodiment of the present invention. The application 94 is provided in software in this embodiment but may in alternative embodiments be provided in hardware or software elements or combinations thereof as appropriate. The application 94 is arranged to be started by the occurrence of a predefined trigger event in the user terminal 12. This trigger event can be for example when the user terminal 12 is switched on, or when both the user terminal 12 is on and another application is started, such as the VoIP client application 72. When the application 94 starts, it is loaded from the memory 82 of the user terminal 12 and run by the baseband processor 78 or the application processor 80. When the contacts management application 94 has started, it accesses a contact information database 96, such as a contact list or a phonebook, stored in the memory 82 of the user terminal 12 and retrieves user contact information from the database 96. The application 94 can be configured, preferably at least by means of a user interface 98, to retrieve contact information of one user or a plurality of users depending on the need at hand. Contact information that is retrieved from the database 96 may comprise a user's name or a user's telephone number(s) or combinations thereof. This is described in greater detail later.

Figure 4:
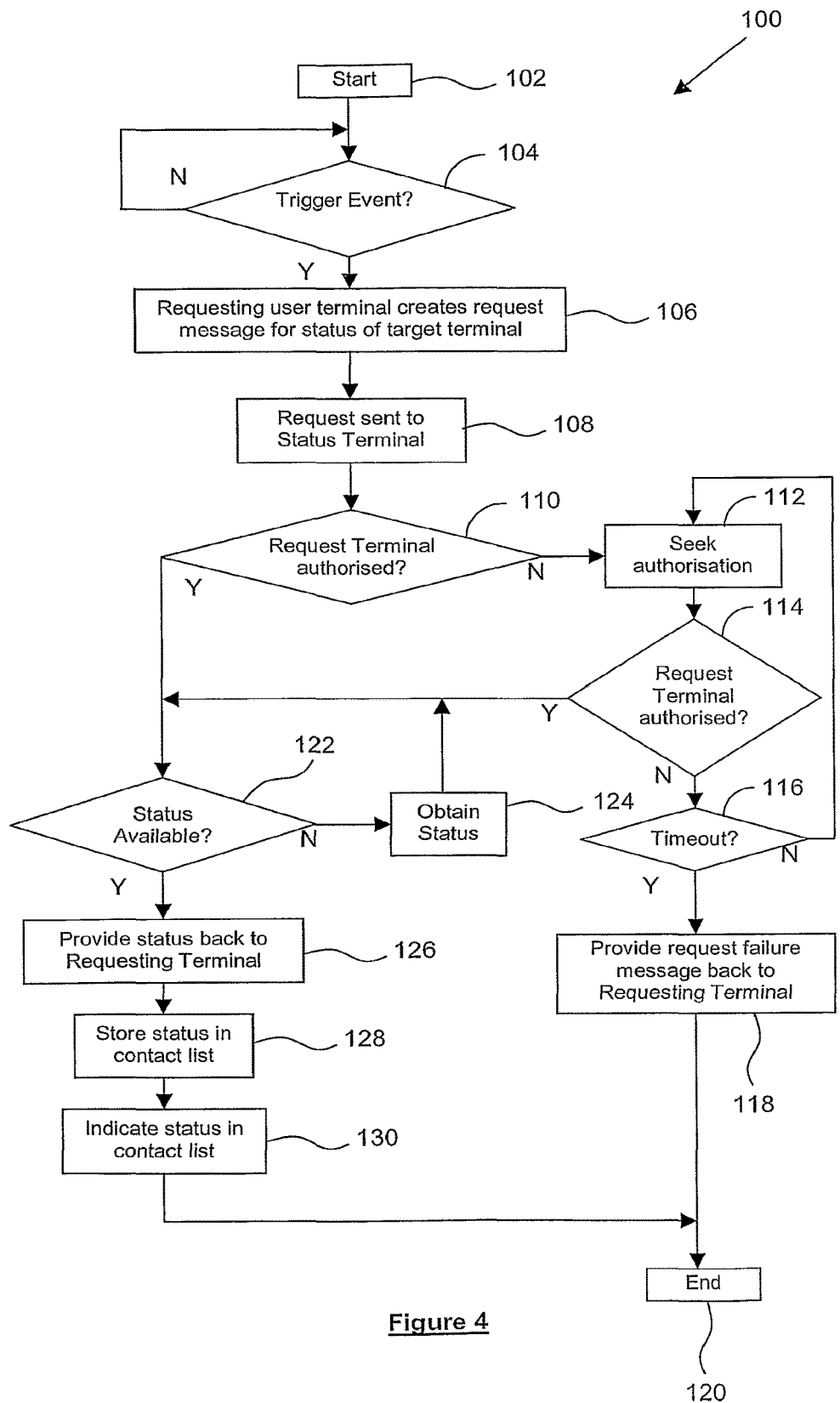
FIG. 4 is a flow chart showing the general operation of the user terminal of FIG. 3 making a status request and the operation of the status server in responding to the request.

Referring now to FIG. 4, an example of how the User A terminal 12 (requesting user) seeks to determine the status of the User B terminal 18 (target user) for establishing a VoIP communication, is described.

The process commences at Step 102 with the requesting user checking at Step 104 for the occurrence of a trigger event. Whilst no trigger event is detected, the process 100 continues checking. An example of a trigger event is the opening of a contacts list on the user terminal 12. On detection at Step 104 of the trigger event, the requesting user 12 creates at Step 106 a status request message for the status of a specific target user 18 or preferably a group of target users. The request is then transmitted at Step 108 to the status server 24 for processing.

On receipt of the status request message, the status server 24 determines at Step 110 whether the requesting user 12 is authorised. As has been explained previously, the authorisation module 46 determines this. If the requesting user 12 is not authorised, the status server 24 attempts at Step 112 to seek authorisation (described in detail later). If the requesting user is still not authorised at Step 114, a timeout check is performed at Step 116. Whilst the authorisation procedure has not timed out, the process returns to the seek authorisation stage at Step 112 of the process. However, if the authorisation procedure has timed out at Step 116, a request failure message is provided back at Step 118 to the requesting user 12 and the process ends at Step 120.

If however in the authorisation procedure, it is determined at Steps 110 or 114 that the requesting user 12 is authorised, then a check on the availability of up-to-date status information is carried out at Step 122. If the status is not available, a status update procedure is implemented at Step 124 and the process is returned with a further check at Step 112 of whether the correct up-to-date status for a given communications channel is now available. Once the status is available, and has been stored in the status database 38, this status is provided back at Step 126 to the requesting user 12. This target user status is then stored at Step 128 in the contacts list 96 of the requesting user terminal 12 and the contact application program 94 running on the requesting user terminal 12 then indicates at Step 130 the updated status of the target user 18 visually (via the display 92) in the contacts list on the user terminal 12. The status request process 100 then ends at Step 120.

Figure 5:
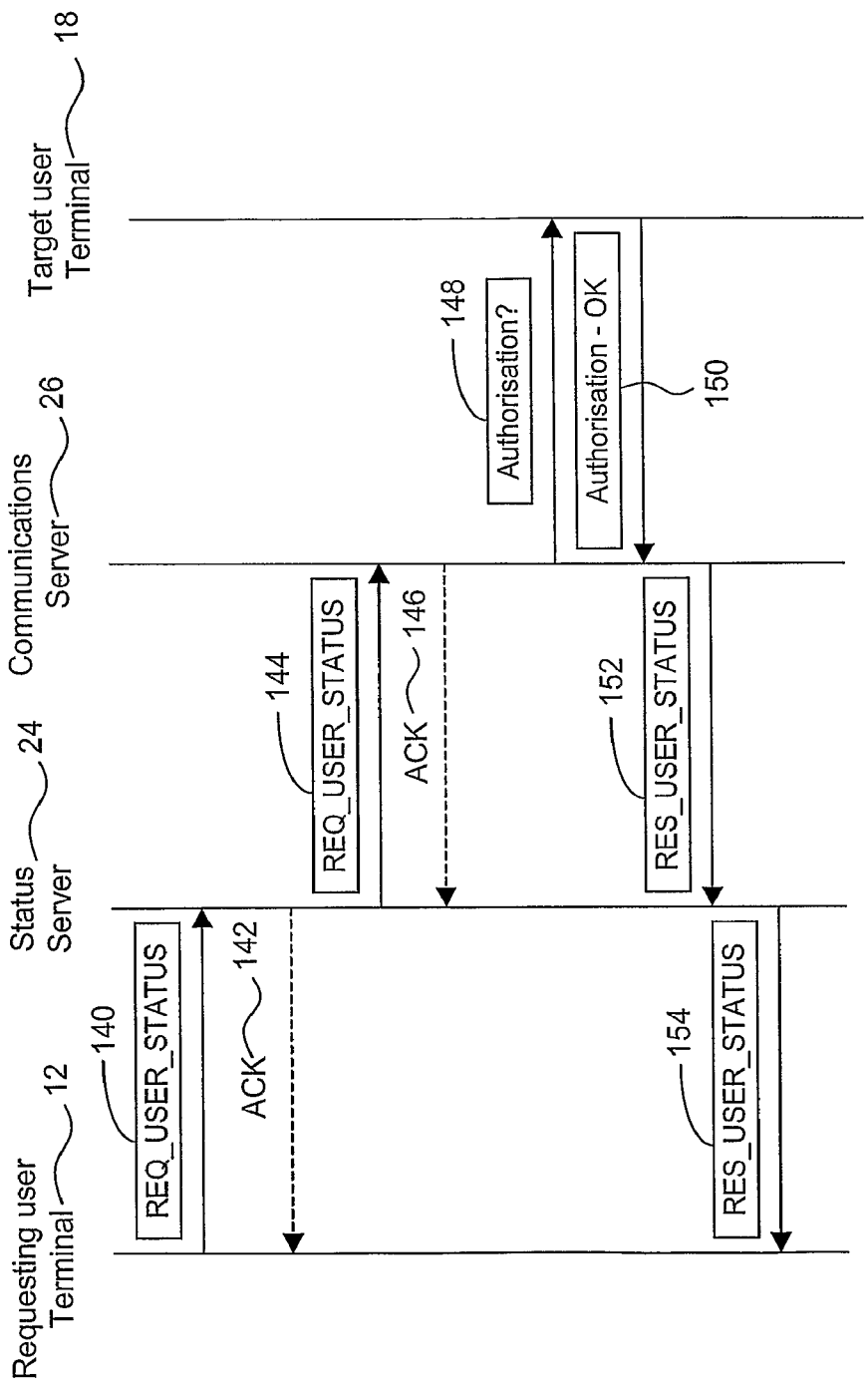
FIG. 5 illustrates a message flow for handling a user request according to an embodiment of the present invention.

Reference is now made to FIG. 5 where further details of the process of requesting a status update from the status server 24 are described. User terminal A 12 is running the contact management application 94 according to the present embodiment. User terminal A 12 wants to determine availability of user terminal B 18 for communication according to a particular communication type. Preferably, user terminal A 12 determines whether user terminal B 18 is available for receiving a VoIP call, but according to the present embodiment user terminal A 12 may also determine availability of user terminal B 18 for communication according to other communication types as well, such as instant messaging, multimedia messaging or a GSM call. In FIG. 5 it is assumed that user terminal B 18 is within a service area of a suitable IP access network, such as WLAN 14, and has successfully completed registration to the communication server 26.

User terminal A 12 sends a request message 140 (denoted with REQ_USER_STATUS) to the status server 24, requesting status information on user terminal B 18. The application 94 of the present invention running on user terminal A 12 sends the request message 140 after the occurrence of the trigger event. This event may be the start of the application 94 and when retrieval of contact information from the memory 82 of the terminal 12 is requested. Alternatively, the trigger may also be the creating and storing of new contact information into the memory 82 of the terminal 12. In order to save battery resources of the user terminal A 12, a plurality of requests can be sent as a group for example in scheduled time slots of GSM air interface.

The request message 140 is preferably a SIP SUBSCRIBE message, with which the user terminal A 12 subscribes to the Presence Event Package of user terminal B 18 according to RFC 3856, but any other suitable message type, such as an SMS including a predetermined character string, may also be used. The SIP SUBSCRIBE message 140 comprises an identification of the presentity, i.e. the user terminal B 18, in the form of, for example, a SPI URI (Uniform Resource Identifier) and the name of the event package, which the subscription is directed to. In this case, the event package is the Presence event package. The identification information is entered into designated header fields of the SIP SUBSCRIBE message 140.

The content of the SIP SUBSCRIBE request message 140 may look like that shown in FIG. 6.

In this example, the user terminal B 18 as a presentity is identified with a SIP URI 162 comprising the terminal's PLMN number. If the VoIP number of user terminal B 18 is known to user terminal A 12, it can also be used to identify user terminal B 18 in a similar manner. The 'Via' header field 164 may contain, for example, the name of the user terminal A 12. The 'From' field 166 identifies, for example by means of a SIP URI, the party that requests the subscription to the presentity's presence status. In this example, the PLMN number of the requesting terminal A 12 is used as a user name portion of the SIP URI 162, but for example the terminal's VoIP number could be used as well.

The SIP SUBSCRIBE message 140 further comprises header fields for call identification 168 and sequence numbers 170 (Call-ID and Cseq). Contact header field 172 indicates where the subscriber of the presence information can be contacted, i.e. where the notifications of the presentity's presence events (e.g. changes in presence information) are to be sent. Content of the Event header field 174 identifies the event package which is subscribed to. In this case, the subscribed event package is the presence event package. The Accept header field 176 indicates the format in which the subscriber wants to receive the presence notifications.

Optionally, the status server 24 acknowledges receipt of the request message by sending an acknowledgement 142 (denoted as ACK). In the case of SIP and presence service, the presence server responds with a SIP 12 OK message.

In the embodiment of the present invention illustrated in FIGS. 4 and 5, the status server 24, preferably a presence server, requests information on the status of the user terminal B 18 from communication server 1, which in a preferred embodiment of the present invention is a VoIP server. As described above, user terminal B 18 is assumed to be within the service area of a IP access network, preferably within a WLAN hotspot 14, and has successfully registered to communication server 1 such that the communication server 26 has recorded the status 30 of the user terminal B 18 as active. The renewal intervals for the registrations 30 at communication server 1 may be set to be relatively short such that communication server 1 is able to detect reasonably early that a user terminal 18 is no longer available for receiving VoIP calls e.g. due to switching off of the terminal 18 or moving of the terminal 18 outside the service area of the IP access network. This high frequency of checking improves the accuracy of the status information 30 maintained at communication server 1.

Any of the communication servers 26 may be arranged to receive and store the status information 30, 34 of users in various ways. For example, one of the communication servers 26 may be a proprietary system with proprietary interfaces towards user terminals and external systems, such as the status server 24. It is a matter of implementation of the proprietary system, what type of status information there is stored in the system and what kind of signalling messages is exchanged between the system and user terminals and/or external systems to input, update, and request status information. As far as the present invention is concerned, each communication server 26 should at least maintain information on the availability of user terminals for communication according to a particular communication type, preferably VoIP, namely each communication server 26 should maintain the status of the its user terminals 12, 18, 20 as 'available' or 'not available' for a given communication channel. A skilled person appreciates that the designations of the statuses may vary. For example, the communications server 26 may designate availability statuses as 'on' or 'off'.

The communication server 1 may also act as a SIP registrar and maintain SIP registration statuses of user terminals. In that case, the user terminals 12, 18, 20 may use the SIP REGISTER method to indicate their status to the communication server 1. For example, the user terminals 12, 18, 20 may use the Contact header field 172 of a SIP REGISTER message 140 to indicate, that they can be contacted at their VoIP number. In that way the communication server 26 receives the information that the user terminal 12, 18, 20 is available for a VoIP call.

In the case that one of the communication servers 26 is a proprietary system, the status server 24 generates a request message 144 in a format that is supported by that communication server 26. For communication server 1, the status server 24 inserts contact information of user terminal B 18 into the request message 144 and sends the message to communication server 1. In the present embodiment, the contact information is the PLMN number of user terminal B 18. The status server 24 may also insert identification information of the requesting party, i.e. the user terminal A 12, into the message.

In the case that communication server 1 acts as a SIP registrar, the status server 24 may subscribe to the register event package of the user terminal B 18 and receive notifications of the initial state and changes in the status of the user terminal B 18. The status server 24 uses the SIP SUBSCRIBE method to subscribe to the register state event package in a similar manner as in the case of the user terminal A 12 subscribing to the presence state event package.

The status server 24 is preferably also arranged to request user terminal B's contact information corresponding to the communication server's supported communication type from communication server 1.

Optionally, communication server 1 may acknowledge the request message 144 by sending an acknowledgement message 146 back to the status server 24.

In an embodiment of the present invention, communication server 1 may send a request message 148 to the user terminal B 18, requesting acceptance from the user of the terminal B 18 for delivering the status information 30 to the requesting user terminal A 12. The target user terminal 18 sends a response message 150 to the communication server 26 and either accepts or denies the request 148. In another embodiment, a user registered with communication server 1, may indicate to the communication server 26 standing instructions for the acceptance or denial of requests from all parties or some parties. These standing instructions can be stored at communication server 1. In that case, when a request 144 from such a party is received, communication server 1 does not need to send a request 148 for acceptance to the user terminal B 18. This procedure can be applied to all networked communication servers 26.

If the user terminal B 18 accepts the delivery of the status information 30 to the requesting terminal 12, communication server 1 retrieves the status information 30 from its local storage, such as its registration database 28, generates a response message 152, inserts the status information 30 of the user terminal B 18 into the message 152, and sends the response message 152 to the status server 24. Communication server 1 may also insert the contact information according to the server's communication type of the user terminal B 18 into the response message 152. In an advantageous embodiment of the present invention, where communication server 1 is a VoIP server, the server 26 inserts the VoIP number of the user terminal B 18 into the response message 152.

The response message 152 may be a proprietary signalling message or a SIP NOTIFY message, depending on whether communication server 1 is a proprietary system or acts as a SIP registrar.

In case the user terminal 18 denies the request for status, communication server 1 may indicate the denial in the response message 152, or indicate for example, that the request is pending.

After the status server 24 has received the response message 152 from communication server 1, the status server 24 generates a response message 154 in order to communicate the status of the user terminal B 18 and preferably also the contact information of the terminal 18 corresponding to the communication serve r's communication type to the user terminal A 30. The response message 154 is preferably a SIP NOTIFY message, and in accordance with the present example, may have the content as shown in FIG. 7:

The SIP NOTIFY message 154 is sent to the address that the user terminal A 12 indicated in the Contact header field 172 of the SIP SUBSCRIBE message 140. In order to save battery resources of the user terminal A 12, the status server 24 may send a plurality of SIP NOTIFY messages 154 as a group, for example by inserting the results into consecutive data packets that are carried in scheduled time slots over a GSM air interface. The SIP NOTIFY message 154 contains header fields corresponding to those of the SIP SUBSCRIBE message. The SIP NOTIFY message 154 differs from the SIP SUBSCRIBE message 140 in that it contains a message body 180 in XML format. The message body 180 comprises for example a registration element 182 which contains the SIP URI of the presentity and in the present example also the status 184 of the presentity as an attribute value. The message body 180 further comprises a contact element 186, which contains the contact information 188 of the user terminal B 18 in a uri element. Preferably, the SIP URI in the uri element contains the VoIP number of the user terminal B 18 and is therefore readily available for the application 94 of the present invention to be included into the contact information database 96 of the user terminal A 12.

The above described use of SIP SUBSCRIBE and SIP NOTIFY message formats are merely preferable. It is also possible to use most of the specific information described as provided in the above message formats and provide the same information in another messaging format without difficulty. The skilled addressee will be able to select which fields of information to use in such a situation without using all of the fields without any difficulty.

The contact management application 94 according to the present invention retrieves the status information and the VoIP number of the user terminal B 18 from the response message 154 and stores them into the memory 82 of the user terminal A 12 for further processing.

Figure 8B:
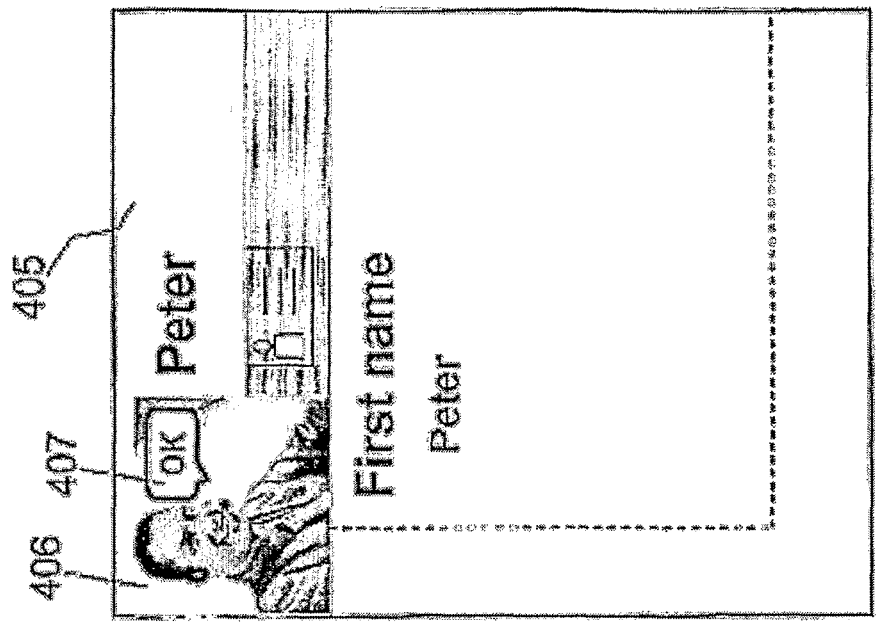
FIGS. 8A and 8B depict examples of user interface elements and their arrangement in a user terminal according to an embodiment of the invention.
Figure 8A:
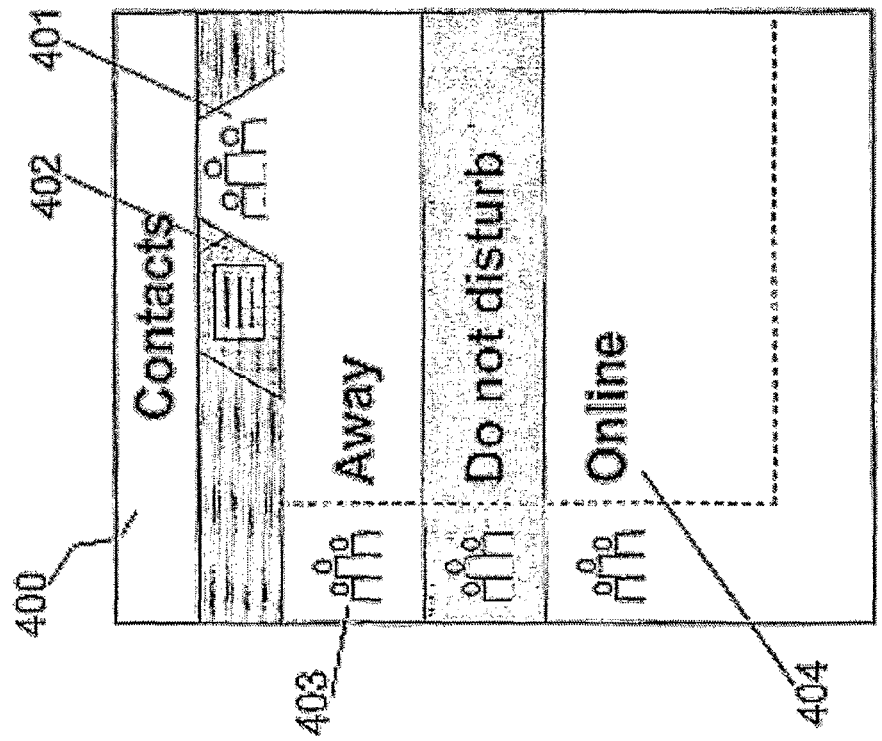

Reference is now made to FIGS. 8A and 8B. The contact management application 94 modifies the contact information of the user(s) whose status information, and preferably also additional contact information, was received from the status server 24 in a manner described above. The contact management application 94 may access and modify the contact information database 96 of the user terminal 12, for example, by means of an Application Programming Interface (API) provided by the operating system of the terminal 12. The application 94 may, for example, create a new contact group, designated as 'Online', and add the user(s) whose status is 'active' to the new contact group. The content management application 94 may add the additional contact information, preferably the VoIP number(s) of the user(s), to the contact information database 96. If the contact information database 96 contains pictures/image assigned to users' contact information, the application 94 may modify the pictures of the users, whose status is 'active' to include a visual indication of the active status of the users. This can be carried out for each of the different modes of communication as is described in detail below.

When a user of the terminal 12 accesses the contact information database 96 by means of the user interface 98 of the terminal 12, a user interface module 98 of the terminal generates a phonebook view 400 of the new or modified contact information. FIG. 8A shows an example of a phonebook view 400 for a mobile telecommunications device, such as a mobile telephone which has a limited screen size. It is important for the graphical user interface in such devices to be optimised to account for the limited screen size.

In FIG. 8A, it can be seen that contact groups and individual contacts are arranged onto separate pages that can be viewed by means of tabs 401 and 402 respectively. The contact groups are made up of individual contacts in the contact database which have been grouped together because they share a common attribute or feature. Contact groups that are stored into the contact information database in the memory of the terminal may be shown in a list on the contact groups page 401. A symbol 403 may be used to indicate that the name in the list represents a contact group.

FIG. 8A also shows the newly created contact group 'Online<1> 404. Here it is to be appreciated that these groups have dynamic membership which is determined by their currently determined availability status. This is preferably determined by sending a single request for the updating status of all of the contacts on the list, and then using the results of the request to dynamically sort the entries in the contacts list into their current availability groups. If the number of contacts is large, then a batch of requests can be sent as a group for example, in scheduled time slots of a GSM air interface. This has the advantageous effect of minimising battery consumption for the reason that has been described previously.

Whilst determining the availability status of all the contacts in the contacts database 96 represents the optimum manner in keeping the availability status correct, it is also possible for the availability status of subgroups of the entire contacts list to be determined. There are different ways in which a subgroup can be determined. For example, for those contacts in the contact list where information has been received of their relatively long term constant unavailability status, for example stating that that contact is to be 'away' for three weeks (see later 'rich' presence data), they can be excluded from the subgroup whose availability status is to be checked more regularly. Their exclusion from the subgroup of contacts whose current availability is to be checked can be changed when the time period specified for them being 'away' expires.

The same applies to the 'do not disturb category' which may have an expiry time associated with it for this constant status and which could also be excluded from any availability status checking subgroup.

The subgroup for which the current availability status is to be requested can be determined in many different ways and this advantageously provides a way of reducing the required amount of information for updating the contacts list 96 with availability data.

Whatever the size of the subgroup or group, the status availability information is obtained by sending a single batch of availability requests to the status server 24.

FIG. 8B shows an example of a phonebook page 405 for an individual contact. The contact information comprises a picture 406 assigned to the contact information, together with all of the contacts other details (not shown). It is to be appreciated that the provision of an image 406 in the contact details of a user helps the mobile device user identify the target user quickly and more easily than from reading text information only.

FIG. 8B also shows the newly added visual indication 407 of the contact's availability for a VoIP call. This indication 407 is shown in this embodiment as a speech bubble with the communication status written within the speech bubble. To the mobile phone user the use of a particular type of indication is associated with a particular type of communication. Other types of communication, such as instant messaging, may be represented by other types of visual indications. For example, a shorthand smiley icon ':)' or '(c)' may represent the online status of the individual contact to an instant messaging communication. Other indications are used for other types of communications. Whatever the indication used, this is always overlaid over the image of the individual contact, namely the indication is always within the graphical perimeter of the image. This minimises the space requirement on the limited size graphical user interface whilst maximising the entropy of image itself. The contact's VoIP number and/or addresses of other communication types is also added to the contact information displayed for the individual, but this is not shown in FIG. 8B.

The present invention has been described with references to embodiments shown in the appended drawings, but it is to be appreciated that a person skilled in the art understands that the present embodiments are exemplary only and can be modified without departure from the spirit and scope of the present invention. For example, a desired communication type may be for example a GSM call. In such an embodiment, with reference to FIG. 5, the status server 24 may send the message requesting the registration status of the user terminal 31 to a Home Location Register (HLR) of the target user terminal's home PLMN. The status server 24 may use e.g. a Mobile Application Part (MAP) protocol message to interrogate the HLR.

The status server 24 or any of the communication servers may also be arranged to store and deliver a versatile set of presence information for users. In such a 'rich' presence information, the users may register as being in practically any state of presence. For example, the user may indicate that he is in a particular physical location, such as in a meeting room or in a car, and/or involved in a particular activity, such as being in a fast moving vehicle. The user may have a different state of presence at different times a day and/or with respect to the type of party requesting the presence information. For example, outside office hours the user may want to indicate to his colleagues, that he is not available for any type of communication, but for his family members, that he is indeed available.

The user may configure the mobile user terminal to register a new presence status when he changes the user profile of his mobile terminal, in other words, the change of user profile can be a trigger event. For example, when the user activates the 'meeting' profile, the mobile user terminal may automatically send an update to the user's presence state. The mobile user terminal may further be configured to update the user's/mobile terminal's presence status according to changes in cell identification and/or network identification information that the mobile user terminal receives from a new cell and/or network to which the mobile user terminal is handed off or roams. The mobile user terminal may also be configured to update the presence status according to phone use or call activity. For example, the mobile terminal may be configured to update the presence status such that incoming calls are rejected when the user is engaged in a call or is using the mobile terminal's calendar functions. The mobile terminal may also show the user's presence state in a Screensaver.

'Rich' presence data may be communicated to the status server 24, communication servers, or any other server providing a presence service by means of, for example, the message body of a SIP REGISTER message. The message body may be in XML format for example, which allows flexible structure and content of the body.

The invention claimed is:

1. A method for determining the availability of at least one target user for a specific type of communication, the method comprising: retrieving contact information of at least one target user from a memory of a requesting user terminal; sending a request for communication status information of the at least one target user to a status network element, the status network element being arranged to provide the communication status information regarding the availability of the target user for the specific type of communication, wherein the request comprises at least a portion of the contact information of the at least one target user and identifies the specific type of communication; receiving, as a response to the request, a response message from the status network element, wherein the response message comprises the communication status information of the at least one target user; and modifying at least a portion of stored contact information when the received status information indicates that the target user is available for communication via the specific communication type, such that the modified contact information indicates on the requesting user terminal the current availability of the at least one user for communication via the specific communication type.

2. The method according to claim 1, further comprising sensing the occurrence of a predetermined trigger event in the operation of the user terminal, and sending the request for status information automatically as a response to the sensed trigger event.

3. The method according to claim 2, wherein sensing step comprises sensing storing of new contact information into the memory of the user terminal as the trigger event.

4. The method according to claim 2, wherein sensing step comprises sensing the commencing of a communication application for a specific communication type on the user terminal, as the trigger event.

5. The method according claim 1, wherein the sending step comprises sending a request for status information for a group of target users to the status network node to determine the communication availability status of each member of the group for the specific type of communication.

6. The method according to claim 5, wherein the sending step comprises sending a batch of requests for the group of target users by delaying a report of a presence status change for selected target users until a scheduled update interval.

7. The method according to claim 5, wherein the receiving step comprises receiving a plurality of response messages, one for each member of the group.

8. The method according to claim 7, wherein the receiving step comprises receiving a response message, wherein the response message comprises a collection of communication availability status responses for the group of target users.

9. The method according to claim 1, wherein the response message comprises communications status information for a plurality of types of communication possible with the at least one target user.

10. The method according to claim 8, wherein the plurality of types of communication possible with the at least one target user in combination define an available multiple-type communications path to the target user.

11. The method according to claim 1, further comprising adding a visual indication of the at least one user's availability for the specific type of communication to the user's contact information.

12. The method according to claim 1, further comprising adding the at least one user to a contact group of users.

13. The method according to claim 12, further comprising creating a new contact group of users at the requesting user terminal and the adding step comprises adding the at least one user to the new contact group of users.

14. The method according to claim 13, wherein the creating step and adding steps are implemented on a dynamic group, where membership of the group is based upon the current communication availability status of each user.

15. The method according to claim 1, wherein the receiving step comprises receiving in the response message the at least one user's current contact information for the specific communication type, the current contact information being provided by the status network element.

16. The method according to claim 1, further comprising modifying an image forming part of the target user's contact information such that the modified image includes an overlaid visual indication of the target user's availability for the specific type of communication.

17. The method according to claim 16, wherein the modifying step comprises modifying the image to indicate that a plurality of different types of communication are available for the target user.

18. The method according to claim 1, wherein the specific communication type comprises Voice over IP (VoIP).

19. The method according to claim 1, wherein the specific communication type comprises instant messaging or multimedia messaging.

20. The method according to claim 1, wherein the specific communication type comprises a GSM call.

21. A requesting communication user terminal for determining the availability of at least one remote target user for a specific type of communication, the terminal comprising:
 a memory for storing contact information of a plurality of target users;
 a retriever for retrieving contact information of at least one target user from the memory;
 a transmitter for transmitting a request for communication status information of the at least one target user to a status network element, the status network element being arranged to provide the communication status information regarding the availability of the target user for the specific type of communication, wherein the request comprises at least a portion of the contact information of the at least one target user and identifies the specific type of communication;

a receiver for receiving, as a response to the request, a response message from the status network element, wherein the response message comprises the communication status information of the at least one target user; and a modifier for modifying at least a portion of stored contact information when the received status information indicates that the target user is available for communication via the specific communication type, such that the modified contact information indicates on the requesting user terminal the current availability of the at least one target user for communication via the specific communication type.

22. The terminal according to claim 21, further comprising a set of predetermined trigger events stored in the terminal, and a sensor for sensing the occurrence of one of the predetermined trigger events in the operation of the user terminal, and in response thereto automatically activating the transmitter to send the request for status information.

23. The terminal according to claim 21, further comprising adding means for adding the at least one user to a stored contact group of users.

24. The terminal according to claim 23, further comprising creating means for creating a new contact group of users at the requesting user terminal and wherein the adding means is arranged to add the at least one target user to the new contact group of users.

25. The terminal according to claim 24, wherein the creating means and the adding means arranged to operate on a dynamic group, where membership of the group is based upon the current communication availability status of each target user.

26. A status network element for providing a communications availability status of a target networked user terminal for a specific type of communication channel, the status network element comprising: memory containing a database of registered user entries, each registered user entry including status information about a particular type of communications channel, the status information comprising: the address of a registered user terminal within that channel and the status of the connection availability to the user terminal within the channel; a compiler arranged to retrieve status information regarding a registered user from at least one networked communication element with which the target user terminal is registered for a particular type of communications and to store the same in the database; a receiver arranged to receive a communications status request for a target user terminal and to retrieve the relevant registered user entry from the database; and a communicator for transmitting the retrieved communication status and network address of the target user terminal to a requesting user terminal for updating an communications availability status of the target user within a stored list of target users.

27. The status network element according to claim 26, wherein the compiler is arranged to generate a request message for retrieving the required status information, the request message being in a format supported by the networked communications element.

* * * * *